United States Patent Office 3,850,884
Patented Nov. 26, 1974

3,850,884
BIS-(β-AMINOACRYLYL) DERIVATIVES USED AS HEAT STABILIZERS FOR CHLORINATED POLYMERS
Richard G. Parker, Brecksville, Ohio, assignor to The B. F. Goodrich Company, New York, N.Y.
No Drawing. Original application Oct. 29, 1971, Ser. No. 193,998, now Patent No. 3,784,565. Divided and this application May 7, 1973, Ser. No. 357,867
Int. Cl. C08f 45/60
U.S. Cl. 260—45.85 N     6 Claims

ABSTRACT OF THE DISCLOSURE

Bis-(β-aminoacrylyl) compounds are prepared in a process comprising first reacting a cyclic hydrocarbon with a cyanoacetylating agent to form an intermediate, and then reacting the intermediate with an alcohol and a hydrogen halide followed by the addition of sodium bicarbonate. The compounds are particularly useful as heat stabilizers for chlorine-containing polymers, especially polyvinyl chloride.

This is a division of application Ser. No. 193,998, filed Oct. 29, 1971 now U.S. Pat. 3,784,565.

BACKGROUND OF THE INVENTION

Chlorine-containing polymers form a very large segment of the class of packaging materials. Their utility is somewhat limited, however, by their relatively low heat stability. This instability evidences itself by darkening of the polymer and the emission of hydrogen chloride upon heat aging. Many different types of compounds have been employed to improve the heat stability of chlorine-containing polymers, especially polyvinyl chloride. These stabilizers are divided into two general classes of compounds, metallic and non-metallic. The metallic types, especially the organo-metallic compounds, have received much attention because they are quite efficient. However, these stabilizers are highly restricted in the packaging area due to limits on the types and amounts of metals that can be present. Non-metallic stabilizers are used in these cases, but always at a large loss in stabilizer efficiency.

SUMMARY OF THE INVENTION

A novel class of non-metallic stabilizers has been discovered that provides improved heat stability for chlorine-containing polymers. The compounds are bis(β-aminoacrylyl) derivatives of cyclic hydrocarbons.

DETAILED DESCRIPTION

The bis(β-aminoacrylyl) compounds are of the formula

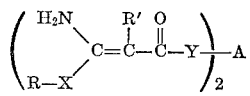

wherein X is —O— or —S—; Y is —O—, —S—, or

R is an alkyl group containing 1 to 24 carbon atoms or an aryl group containing 6 to 18 carbon atoms; R' is —H, —CH$_3$, or —C$_2$H$_5$; and A has the formula

wherein R$_A$ is a cyclic hydrocarbon selected from benzene and naphthalene and alkyl derivatives thereof, or a cycloalkyl containing 5 to 8 carbon atoms in the ring and alkyl derivatives thereof, and n=0 to 6.

Examples of such compounds are 1,4-bis-(β-methoxy-β-aminoacrylyloxy)benzene;
α,α'-bis-(β-ethoxy-β-aminoacrylyloxy)-1,4-dimethylbenzene;
α,α'-bis-(β-ethylthio-β-aminoacrylyloxy)-1,4-dimethylbenzene;
α,α'-bis-(β-ethoxy-β-aminoacrylylamino)-1,4-dimethylbenzene;
α,α'-bis-(β-ethoxy-β-aminoacrylyloxy)-1,4-dimethylcyclohexane;
α,α'-bis-(β-ethoxy-β-aminoacrylylthio)-1,4-dimethylbenzene;
α,α'-bis(β-benzyloxy-β-aminoacrylyloxy)-1,4-dimethylmethylbenzene;
α,α'-bis(β-octadecylthio-β-aminoacrylyloxy)-1,4-dimethylbenzene;
α,α'-bis(β-4-butylbenzyloxy-β-aminoacrylyloxy-1,4-dimethylbenzene;
1,4-bis-(β-dodecylthio-β-aminomethacrylyloxy)benzene;
β,β'-bis-(β-butoxy-β-aminoacrylyloxy)-1,4-diethylbenzene;
γ,γ'-bis-(β-octylthio-β-aminoacrylyloxy)-1,4-dipropylbenzene;
2,6-bis-(β-ethoxy-β-aminoacrylyloxy)naphthalene;

and the like.

Preferred are those compounds wherein Y is —O— or —S—; R is an alkyl group containing 1 to 18 carbon atoms; R' is —H; and where as has n=0 or 1 and R$_A$ is a benzene or a cyclohexane radical. Examples of such compounds are α,α'-bis-(β-ethoxy-β-aminoacrylyloxy)-1,4-dimethylbenzene;
α,α'-bis-(β-ethoxy-β-aminoacrylylthio)-1,4-dimethylbenzene;
α,α'-bis-(β-ethoxy-β-aminoacrylyloxy)-1,4-dicyclohexane;
α,α'-bis-(β-octadecylthio-β-aminoacrylyloxy)-1,4-dimethylbenzene;

and the like. More preferred are those compounds where R$_A$ is a benzene radical. Excellent results were obtained using α,α'-bis-(β-ethoxy-β-aminoacrylyloxy)-1,4-dimethylbenzene and α,α' - bis-(β-ethoxy-β-aminoacrylylthio)-1,4-dimethylbenzene.

The bis(β-aminoacrylyl) cyclic compounds are prepared in a three-step process. In the first step, a dicompound of the formula

wherein R$_A$ and n are defined as above and Y$_a$ is selected from the group consisting of —OH, —SH, —Cl, and —NH$_2$, is reacted with a cyanoacetylating agent to make a bis(cyanoaceto) intermediate.

Examples of the dicompounds are 1,4-dihydroxy benzene;
1,4-di-(α-hydroxymethyl)benzene;
1,4-di-(γ-hydroxypropyl)benzene;
1,4-di-(α-hydroxymethyl)cyclohexane;
1,4-di(mercapto)benzene;
1,4-di-(α-mercaptomethyl)benzene;
1,4-di-(β-mercaptoethyl)cyclohexane;
1,4-di-(α-chloromethyl)benzene;
1,4-di-(δ-chlorobutyl)benzene;
1,4-di-(amino)benzene;
1,4-di-(α-aminomethyl)benzene;
2,7-di-(hydroxy)naphthalene;

and the like.

The cyanoacetylating agents have the formula

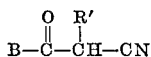

wherein R' is defined above and B is selected from the group of —OH, —Cl, —Br, —OM where M is a monovalent or divalent metal such as Na, K, Ag, Pb, and the like, —OR where R is an alkyl group containing 1 to 8 carbon atoms, and

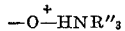

salts wherein R'' is —H or an alkyl group containing 1 to 8 carbon atoms.

Examples of such compounds are cyanoacetic acid; ethyl cyanoacetate; butyl cyanoacetate; cyanoacetyl chloride; cyanoacetyl bromide; the Na and Ag salt of cyanoacetic acid; the triethylamine salt of cyanoacetic acid; and the like. Preferred are the compounds wherein B is —OH, —OCH$_3$, —OC$_2$H$_5$, —Cl, and

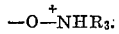

Examples of such are cyanoacetic acid, cyanoacetyl chloride, methyl cyanoacetate, ethyl cyanoacetate, the triethyl ammonium salt of cyanoacetic acid, and the like.

The cyanoacetylating agent is reacted with the dicompound using about two moles of cyanoacetylating agent for one mole of the dicompound, although an excess of the agent can be used. The reaction can be performed without a solvent but preferably a solvent is used. Typical solvents are alkanes such as hexane and heptane, aromatics such as benzene and toluene, and dimethylformamide, dimethylsulfoxide, and ethylenedichloride.

The reaction is preferably conducted in the presence of a catalyst. The catalyst is used in amounts from about 0.0001 mole to about 0.01 mole for acids, and about 0.1 mole to about 2 moles for bases. A dihydroxy dicompound of the above formula readily reacts with a cyanoacid or cyanoacetate in the presence of an acid catalyst. The acid can be a mineral acid such as hydrochloric acid or sulfuric acid, or an organic acid such as p-toluene sulfonic acid. A dimercapto dicompound reacts with a cyanoacetyl chloride or bromide in the presence of a base such as a tertiary amine. Typical amines are trimethylamine, triethylamine, N,N-dimethylaniline, and the like. The reaction between a dichloride dicompound and a cyanoacetic acid/amine salt requires no catalyst to be added.

The temperature of reaction is from about 50° C. to about 150° C. A convenient manner in which to conduct the reaction is to run it at the reflux temperature of the solvent. In this manner, by-products such as water can be removed from the system. Reaction times range from about 8 to about 24 hours. Yields of the intermediate product are about 50% based on the amount of the dicompound used. The intermediate can be isolated by heating under reduced pressure to remove the solvent.

The intermediate product of step one is a bis(cyanoaceto) cyclic compound. This is reacted in step two with an alcohol or thioalcohol and a hydrogen halide.

The alcohol or thioalcohol is of the formula R—XH wherein X is —O— or —S—, and R is an alkyl group containing 1 to 24 carbon atoms or an aryl group containing 6 to 18 carbon atoms. Examples of such compounds are methanol, ethanol, propanol, isopropanol, tertiary butanol, hexanol, n-octanol, n-decanol, n-octadecanol, and the like; phenol, benzyl alcohol, 4-ethyl phenol, 4-tert-butyl phenol, 1-hydroxypropyl benzene, and the like; ethyl mercaptan, t-butyl mercaptan, octyl mercaptan, dodecyl mercaptan, octadecyl mercaptan, and the like; mercapto benzene, benzyl mercaptan, 4-methyl benzyl mercaptan, and the like.

Preferred are those alcohols wherein R is an alkyl group containing 1 to 18 carbon atoms. Examples of such are methanol, ethanol, butanol, octanol, decanol, dodecyl alcohol, octadecanol, octyl mercaptan, decyl mercaptan, tetradecyl mercaptan, octadecyl mercaptan, and the like.

The alcohol or thioalcohol is used in amounts from about two moles to about three moles per mole of the intermediate compound, but a larger excess of alcohol can be used.

The hydrogen halide is anhydrous hydrogen chloride gas, hydrogen bromide gas, or hydrogen iodide gas. Preferred is anhydrous hydrogen bromide or hydrogen chloride gas. The amount of hydrogen halide used is from about two moles to about three moles per mole of intermediate, but a larger excess can be used. The reaction is preferably conducted in a solvent for the intermediate. Such solvents are the same as used in step one of the reaction, being hexane, benzene, and ethylenedichloride, and the like.

The temperature of the step two reaction is from about —10° C. to about 30° C. Reaction times are from about 6 hours to about 10 hours. Yields are about 90% based on the amount of intermediate used. The step two product is an alcohol or thioalcohol hydrogen halide salt complex of the cyanoaceto group on the intermediate.

The step two product can be isolated by cooling down and filtering the reaction mixture. The material can then be washed with cold dichloroethane to purify it.

In step three, the salt complex of step two is added to a mixture of sodium bicarbonate in water and dichloroethane. The reaction neutralizes the salt complex. The resulting grouping is a β-alcohol-β-aminoethylidene group. The compound is dissolved in the dichloroethane phase which is extracted and heated under reduced pressure to isolate it. The compound can be purified by dissolving it in hot benzene and then adding hexane to the solution to precipitate it out. The step three reaction takes about one hour. Yield of this reaction is about 80% based on the step two salt complex.

The bis(β-aminoacrylyl) compounds have particular utility as stabilizers for chlorine-containing polymers, especially polyvinyl chloride.

The compounds can be admixed with the polymers on two-roll mills, internal mixers such as banburys and extruders, and the like. The mixing is conducted in these cases at the melt conditions of the polymer. A preferred method is to dissolve the stabilizer in a solvent, add this to a slurry of the polymer, and evaporate off the solvent(s).

The bis(β-aminoacrylyl) compounds are used in amounts from about 0.1 to about 5 parts by weight based upon 100 parts by weight of the polymer, and more preferably from about 0.3 to about 3 parts by weight. They can be readily used with other known stabilizers such as the organotin stabilizers, certain metal salts, fatty acid metal salts, urea derivatives, phenolic antioxidant, polyhydric alcohols, and thiodialkionic esters.

Examples of chlorine-containing polymers which can be effectively stabilized by the compounds of this invention are polyvinyl chloride, polyvinylidene chloride, chlorinated polyethylene, and polymers containing units of chlorinated monomers such as vinyl chloride, vinylidene chloride, and the like.

The following examples serve to more fully illustrate the invention.

EXAMPLE I

Para-xylylene-bis(cyanoacetate) an intermediate product of step one, was prepared using the following recipe:

| | |
|---|---:|
| p-Xylene-α,α'-diol, moles | 0.5 |
| Cyanoacetic acid, moles | 1.0 |
| Concentrated sulfuric acid, moles [1] | 0.0001 |
| Dry benzene, milliliters | 500 |

[1] Moles of H$_2$SO$_4$, sulfuric acid being 96% by weight in water.

The ingredients were charged into a reactor vessel equipped with an agitator, condenser with a trap, and thermometer. The reaction was conducted under a dry nitrogen gas sweep.

Ingredients were heated to the reflux temperature of the solvent, benzene, about 80° C. In this manner, water produced from the acid/alcohol esterification was removed from the system. The time of reaction was set as the time required to trap 90% of the theoretical amount of water. The reaction solution was then cooled to room temperature and the benzene evaporated off under reduced pressure. The solids were dissolved in a 9/1 ethanol/benzene solution. Charcoal was added and the solution filtered hot ($\simeq$60° C.) through Celite. After cooling the filtered solution to about 0° C., the compound crystallized and precipitated. The mix was then filtered, the crystals collected and washed with cold ethanol, and dried under reduced pressure. 68 Grams of solid were collected, reflecting a yield of 50% based on the amount of diol charged. The crystals had a melting point of 85° C.–86° C., and their infra-red (IR) and nuclear magnetic resonance (NMR) spectra were consistent with the desired structure.

The reaction was repeated using p-toluene sulfonic acid as the acid catalyst with similar results.

EXAMPLE II

Para - xylylene - bis - (cyanoacetate) was also prepared using cyanoacetyl chloride in place of cyanoacetic acid as the cyanoacetylating agent. The recipe used was:

| | |
|---|---|
| p-Xylene-$\alpha,\alpha'$-diol, moles | 0.5 |
| Cyanoacetyl chloride, moles | 1.0 |
| N,N-dimethylaniline, moles | 1.0 |
| 1,2-Dichloroethane, milliliters | 500 |

The diol, the amine, and the solvent were added to the reactor vessel and the cyanoacetyl chloride added dropwise to the solution at room temperature. The solution was then heated to reflux (about 84° C.) for 90 minutes. The solution was cooled, diluted with 200 milliliters of water, and filtered. The filtered liquor separated into two phases. The bottom layer, the dichloroethane layer, was separated and evaporated to isolate the solids. These solids are treated as in Example I to recover and purify the intermediate product. The yield obtained was about 50%.

The reaction was repeated using p-xylene-$\alpha,\alpha'$-dithiol in place of the diol with similar results. The intermediate product was then p-xylylene-bis-(cyanothioacetate).

EXAMPLE III

A third method of preparing p-xylene-bis-(cyano-acetate) comprised using p-xylene-$\alpha,\alpha'$-dichloride in place of the diol. The recipe was:

| | |
|---|---|
| p-Xylene-$\alpha,\alpha'$-dichloride, moles | 0.1 |
| Cyanoacetic acid, moles | 0.2 |
| Triethylamine, moles | 0.22 |
| 1,2-Dichloroethane, milliliters | 150 |

The cyanoacetic acid, amine, and 100 milliliters of solvent were charged to the reactor vessel. This resulted in the formation of an acid/amine salt of the cyanoacetylating agent. The dichloride was dissolved in 50 milliliters of solvent and added to the reactor vessel solution. The solution was heated to reflux, about 84° C., for 24 hours. The solution was filtered to remove triethylene hydrochloride and the liquor treated as in Example I to recover and purify the product. Yield was 44%.

EXAMPLE IV

In step two of the process, $\alpha,\alpha'$ - bis - ($\beta$-ethoxy-$\beta$-aminoacryloxy) - 1,4 - dimethylbenzene was prepared from the cyanoacetate intermediates prepared in the above Examples. 0.075 Mole of p-xylylene-bis(cyanoacetate), 0.165 mole of dry ethanol, and 250 milliliters of dry 1,2-dichloroethane were added to a reactor vessel. The solution was cooled to 0° C., 0.165 mole of anhydrous hydrogen bromide gas was added, and the vessel sealed. The temperature was held at 0°–5° C. for 6 hours. The vessel was opened, and the solution filtered to remove the alcohol/hydrogen halide salt of the intermediate. This was washed with cold dichloroethane and dried under reduced pressure. The salt yield was 95% (37 grams) based on the step one intermediate. In step three, a mixture of 0.9 mole of sodium bicarbonate, $NaHCO_3$, was prepared using 400 milliliters of water and 300 milliliters of dichloroethane. The intermediate salt of step two was slowly added to this mixture while keeping the temperature at 0° C.–5° C. After addition, the mixture was stirred for 30 minutes and then allowed to separate. The dichloroethane was separated and dried to isolate the final product. The amount recovered was 21 grams, reflecting a yield of 78% based on the step two salt complex. The product was purified by dissolving it in hot benzene and then precipitating it out by adding hexane to the solution.

Using the procedures as given in Examples I to IV, the following compounds were prepared:

$\alpha,\alpha'$-bis-($\beta$-ethoxy-$\beta$-aminoacrylyloxy)-1,4-dimethylbenzene;

$\alpha,\alpha'$-bis-($\beta$-ethoxy-$\beta$-aminoacrylylthio)-1,4-dimethylbenzene;

$\alpha,\alpha'$-bis-($\beta$-benzyloxy-$\beta$-aminoacrylyloxy)-1,4-dimethylbenzene;

$\alpha,\alpha'$-bis-($\beta$-octadecylthio-$\beta$-aminoacrylyloxy)-1,4-dimethylbenzene;

$\alpha,\alpha'$-bis-($\beta$-ethoxy-$\beta$-aminoacrylylamino)-1,4-dimethylbenzene;

$\alpha,\alpha'$-bis-($\beta$-ethoxy-$\beta$-aminoacrylyloxy)-1,4-dimethylcyclohexane.

EXAMPLE V

Three of the bis($\beta$-aminoacrylyl) compounds were evaluated as stabilizers for a polyvinyl chloride (PVC) resin. Testing consisted of heat aging the samples at 180° C. and observing the onset of a rapid hydrogen chloride (HCl) evolution.

The samples were prepared by dissolving the stabilizer in a solvent such as benzene, making a slurry of polyvinyl chloride (PVC) powder in a solvent (benzene), mixing the two and evaporating off the solvent under reduced pressure until a free-flowing powder is obtained. 100 Milligrams of the treated PVC powder is weighed into a sample dish and placed into a heated glass tube. A pre-heated carrier gas is let in at the bottom of the tube and it flows around the sample dish, sweeping any volatiles with it. The carrier gas is funneled into and bubbled through neutral water in a conductivity cell. The ion change due to the HCl carried by the gas into the water is measured and recorded. Although this method can allow for direct calculation of the HCl amount emitted by the PVC, the test is usually used in a relative manner. This means that the actual HCl emission is not measured but the rate of emission is observed and compared to a non-stabilized PVC. The HCl emission in a stabilized PVC follows a pattern in which there is an induction period followed by a rapid, continual HCl emission. A plot of ion concentration (HCl emission) versus time will show an almost horizontal induction period followed by a rapid, almost vertical emission period. The point of intersection of a line drawn to the slope to each of these periods is taken as the point of failure of the stabilizer. At times there is a small change in slope of the ion concentration curve between the induction period and the rapid emission period. This is considered part of the induction period as the HCl emission is still being effectively inhibited.

Included in the test was an unstabilized PVC sample as a control and a sample of PVC containing a bis-(aminocrotonate) as described within U.S. Pat. 3,518,224. The stabilizers were used at 2.0 parts by weight. Results are listed in the following table

| Stabilizer: | Time to Rapid HCl Emission (min.) |
|---|---|
| None | 9 |
| A [1] | 93 |
| B [2] | 105 |
| C [3] | 68 |
| Advastab 70 [4] | 45 |

[1] α,α'-bis-(β-ethoxy-β-aminoacrylyloxy)-1,4-dimethylbenzene.
[2] α,α'-bis-(β-ethoxy-β-aminoacrylylthio)-1,4-dimethylbenzene.
[3] α,α'-bis-(β - ethoxy-β-aminoacrylyloxy)-1,4-dimethylcyclohexane.
[4] Thiodiethylene-bis-(β-aminocrotonate).

The example shows that the stabilizers of this invention are efficient stabilizers for polyvinyl chloride resins. They are more efficient than a commonly used non-metallic stabilizer.

EXAMPLE VI

The stabilizers were also evaluated in a heat aging test wherein time to discoloration of PVC was the measure of their efficiency. The stabilizers were added to the PVC by dissolving it in benzene, adding the solution to a PVC slurry in benzene, and evaporating off the solvent. The PVC was then milled on a two-roll mill, sheeted off at about a 50 mil thickness, and cut into samples. The stabilizers were used at the level of 2.0 parts by weight per hundred parts of PVC. The samples were placed in a static air oven at 180° C. and checked every 5 minutes for color development. The time to reach a "black" color was measured. Results are in the following table.

| Stabilizer: | Time to "black" color (min.) |
|---|---|
| None | 10 |
| A | 70 |
| B | 65 |

The data shows that the stabilizers of this invention effectively retard color development in PVC resins.

Although the examples were drawn to the use of the stabilizers in PVC, other chlorine-containing polymers such as polyvinylidene chloride and chlorinated polyethylene can be effectively stabilized.

I claim:

1. A composition comprising a chlorine-containing polymer and from about 0.1 part to about 5 parts by weight based upon 100 parts by weight of the polymer of a compound of the formula

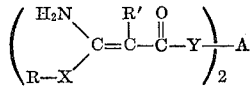

wherein X is selected from the group consisting of —O— and —S—; Y is selected from the group consisting of —O— and —S—; R is selected from the group consisting of an alkyl radical containing 1 to about 24 carbon atoms and an aryl radical containing 6 to 18 carbon atoms; R' is —H, —CH$_3$, or —C$_2$H$_5$; and A has the formula —(CH$_2$)$_n$—R$_A$—(CH$_2$)$_n$— wherein R$_A$ is a cyclic hydrocarbon radical selected from from the group consisting of benzene, naphthalene, and cycloalkyl radicals containing 5 to 8 carbon atoms in the ring, and n=0 to 6.

2. A composition of Claim 1 wherein Y is selected from the group consisting of —O— and —S—; R is an alkyl radical containing 1 to 18 carbon atoms; R' is —H; and R$_A$ is selected from the group consisting of a benzene radical and a cyclohexane radical, and n=0 to 1.

3. A composition of Claim 2 wherein the said chlorine-containing polymer is polyvinyl chloride and the said compound is used in amounts from about 0.3 part to about 3 parts by weight.

4. A composition of Claim 3 wherein the said compound has the formula

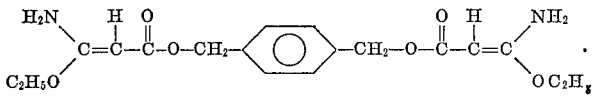

5. A composition of Claim 3 wherein the said compound has the formula

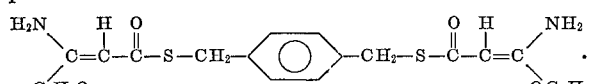

6. A composition of Claim 3 wherein the said compound has the formula

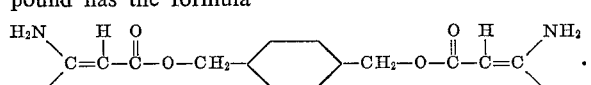

References Cited

UNITED STATES PATENTS

| 3,052,636 | 9/1962 | Strobel et al. | 260—45.9 R |
| 3,079,366 | 2/1963 | Boyle et al. | 260—45.9 R |
| 3,244,668 | 4/1966 | Knapp et al. | 260—45.9 R |
| 3,180,885 | 4/1965 | Nentwig et al. | 260—45.9 R |

DONALD E. CZAJA, Primary Examiner

G. R. MARSHALL, Assistant Examiner

U.S. Cl. X.R.

260—45.9 R, 455 R, 470, 471, 485 R, 559 A, 562 N